Figures 1, 2:
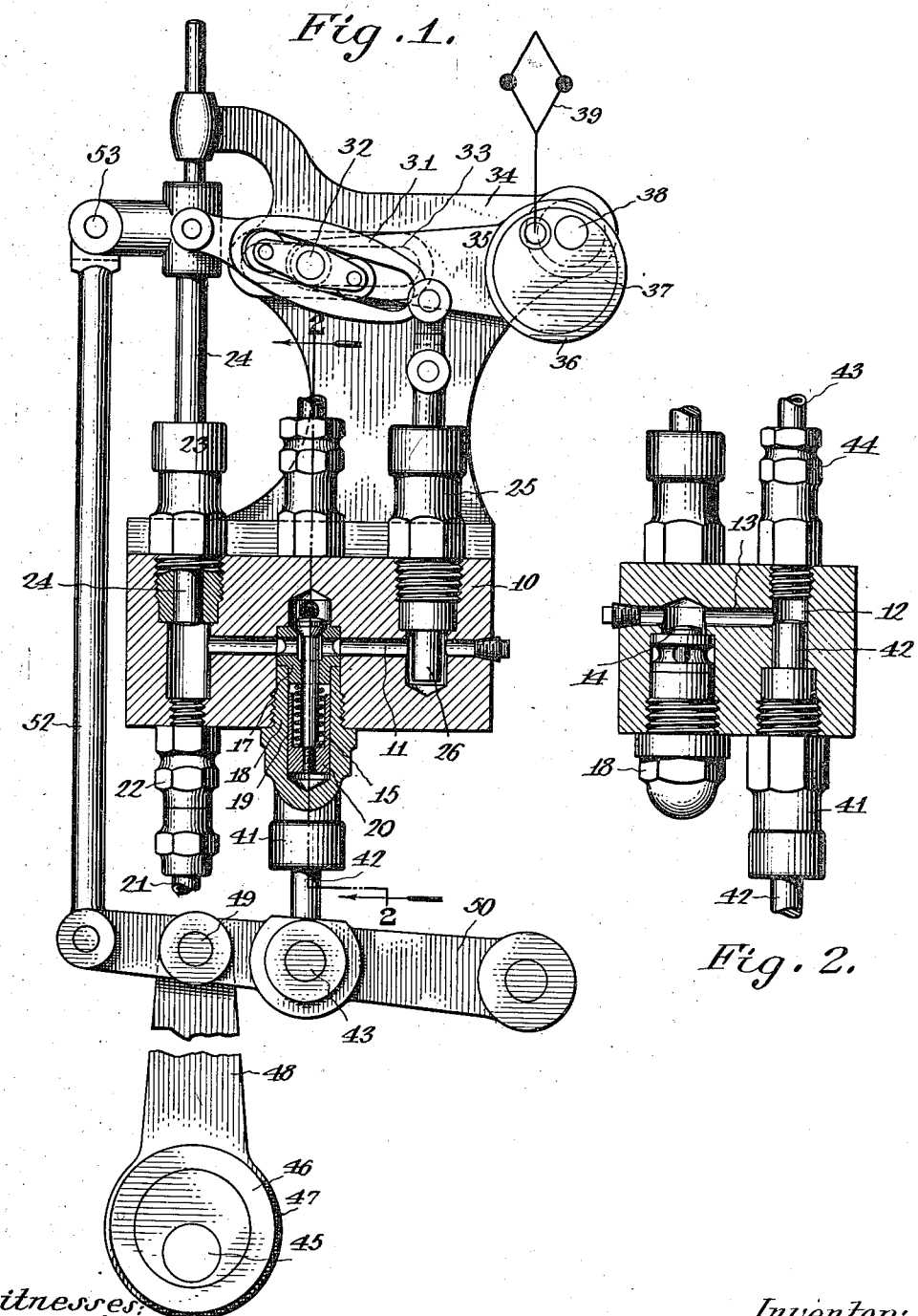

N. McCARTY.
PUMP.
APPLICATION FILED JUNE 14, 1909.

984,688.

Patented Feb. 21, 1911.

Witnesses:
Frank A. Fahle
Thomas W. McMeans

Inventor:
Norman McCarty,
By Bradford Hood
Attorneys.

UNITED STATES PATENT OFFICE.

NORMAN McCARTY, OF INDIANAPOLIS, INDIANA, ASSIGNOR TO ATLAS ENGINE WORKS, OF INDIANAPOLIS, INDIANA, A CORPORATION OF INDIANA.

PUMP.

984,688.  Specification of Letters Patent.  Patented Feb. 21, 1911.

Application filed June 14, 1909. Serial No. 502,041.

*To all whom it may concern:*

Be it known that I, NORMAN McCARTY, a citizen of the United States, residing at Indianapolis, in the county of Marion and State of Indiana, have invented certain new and useful Improvements in Pumps, of which the following is a specification.

In the operation of internal combustion engines of the non-explosive type the fuel is introduced into the combustion chamber in measured quantities which should be accurately measured in accordance with the immediate needs of the engine, in order to maintain a uniform speed. In such engines the fuel is introduced into the combustion chamber at a time when there is a very considerable pressure therein and means must be provided for forcing the measured quantities of fuel through the atomizer into the combustion chamber.

The object of my present invention is to provide a governed pumping mechanism, for the purpose described, in which the governing mechanism, by means of which the measuring mechanism is controlled, will be subjected only to comparatively small pressures so as not to interfere with the delicacy of movement of the controlling speed-controlled governor, the fuel nevertheless being positively delivered by the pump to the engine.

The accompanying drawings illustrate my invention.

Figure 1 is an elevation, in partial section, of a pump mechanism embodying my invention and Fig. 2 a section on line 2—2 of Fig. 1.

In the drawings, 10 indicates the main body of the pump having formed therein a measuring chamber 11 and a delivery chamber 12 which are connected by a passage 13. A valve 14 is arranged between the measuring chamber and the delivery chamber and opens toward the delivery chamber. Valve 14 may be of any desired type, although in practice I deem it preferable to make said valve of the spring-closed type, providing a suitable spring 15 for that purpose. In the form shown, the stem of valve 14 is extended through a nozzle member 17 arranged within the main body of the pump and held in place by means of a cap 18 within which a cylindrical bore 19 is formed to receive a guide head 20 which fits bore 19 and is carried by the end of the stem of valve 14, the guide head 20 being recessed as shown to receive spring 15.

Leading into the measuring chamber 11 is an inlet pipe 21 provided with a suitable, inwardly-opening check valve 22. Projected into chamber 11 through a suitable packing gland 23 is a main plunger 24 and also projected into chamber 11 through a suitable packing gland 25 is a compensating plunger 26. The two plungers 24 and 26 may be operated in any suitable manner so that the discharging effect of the main plunger relative to the chamber 11 may be variably compensated by the movement of the compensating plunger, the arrangement being such that, when the main plunger moves to decrease the containing volume of the measuring chamber 11, the compensating plunger will move in the opposite direction relative to the measuring chamber so as to increase the containing volume thereof, said increase being more or less depending upon the relative movement of the compensating plunger.

In the present form, plungers 24 and 26 are connected by a lever 31 which is provided with a fulcrum 32. This fulcrum 32 is movable relative to the lever 31 so as to vary the relative lengths of its two arms and said fulcrum is also mounted in a slot or guideway 33 formed in a suitable supporting bracket 34. Fulcrum 32 is also connected to, or carried by, an arm 35 which, in turn, is carried by an eccentric strap 36 mounted upon an eccentric 37 carried by a rock shaft 38, which is connected in any suitable manner to a speed controlled governor 39, so that a movement of the speed controlled governor due to variation in speed of rotation thereof will swing the eccentric 37 and thus shift fulcrum 32 relative to lever 31.

Projected into the discharging chamber 12, through a suitable packing gland 41, is a discharging plunger 42 which needs to be moved in synchronism with the other plungers, and leading from the discharging chamber 12 is a discharge pipe 43, said pipe leading to the atomizer (not shown) of the engine, and having therein an outwardly opening check valve 44.

Any suitable means may be used for driving the several plungers and in the present drawings I have shown a shaft 45 suitably geared to the engine. Upon this shaft is an eccentric 46 carrying a strap 47 provided with an arm 48 connected at 49 to a lever 50. The plunger 42 is connected at 43 with lever 50, and also connected to said lever is a link 52 which is connected at 53 with plunger 24.

The operation is as follows:—With the parts in the position shown in the drawings, fulcrum 32 is equidistant from the ends of lever 31, so that movement of plunger 24 into chamber 11 will cause an equal movement of plunger 26 out of chamber 11, and consequently the two plungers being of the same displacing value, there will be no material pressures within chamber 11 and no discharge therefrom. By swinging eccentric 37 downward, fulcrum 32 will be thrown to the right, thus shortening the right-hand arm of lever 13 and lengthening the left-hand arm, so that the movement of the compensating plunger 26 will be less than the movement of the plunger 24 and, when plunger 24 is driven into chamber 11, a volume of oil will be driven from chamber 11 outward past valve 14, against the action of spring 15, the said amount being accurately determined by the difference in movement of the two plungers. Under these conditions the only pressure which will be exerted upon the fulcrum 32 cannot exceed the strength of spring 15 which, as will be seen, need not materially exceed the vacuum producible within chamber 12. The oil, which is discharged past valve 14, will be driven over into chamber 12 at a time when piston 42 is being withdrawn therefrom. On the subsequent instroke of plunger 42, the amount of oil previously delivered into the chamber 12 will be driven out through pipe 43 against any pressure which may exist in said pipe, but this pressure cannot in any way reach the plungers 24 and 26 and therefore cannot in any way affect the delicacy of operation of the speed-controlled governor.

It will be seen that, in the form shown, the plunger 42 having a fixed stroke, and the check valve 41 preventing any back flow into chamber 12 from pipe 43, there will be a tendency for plunger 42, on its outstroke, to produce a vacuum in chamber 12 and consequently the spring 15 (or other means by which valve 14 is held closed during the discharging action of plunger 42) needs be only sufficient in strength to prevent an opening of the valve 14 except as a result of the discharging action of plunger 24. It is true that the spring 15 might be omitted, but in that case the valve 14 would be apt to be somewhat erratic in action and consequently the measuring action of the apparatus would not be as accurate and uniform as is really desirable.

I claim as my invention:

1. In a pump comprising a measuring chamber, a discharge chamber and an intermediate connection between said chambers, an ejecting plunger coöperating with the measuring chamber, a compensating plunger also coöperating with the measuring chamber, means for reciprocating the two plungers in opposite directions relative to the chamber whereby the movement of one will compensate the movement of the other, a discharging plunger arranged to coöperate with the discharge chamber, and a valve arranged between the measuring chamber and the discharging chamber.

2. In a pump comprising a measuring chamber, a discharge chamber and an intermediate connection between said chambers, an ejecting plunger coöperating with the measuring chamber, a compensating plunger also coöperating with the measuring chamber, means for reciprocating the two plungers in opposite directions relative to the chamber whereby the movement of one will compensate the movement of the other, means for variably controlling the relative movement of the two plungers, a discharging plunger arranged to coöperate with the discharge chamber, a valve arranged between the measuring chamber and the discharging chamber and means for closing said valve during the discharge movement of the plunger in the discharge chamber.

3. In a pump comprising a measuring chamber, a discharge chamber, and an intermediate connection between said chambers, a valve arranged in said passage, a plunger projectable into the measuring chamber, a compensating plunger also projectable into the measuring chamber, a lever connecting said two plungers for opposite movement relative to the measuring chamber, a fulcrum for said lever, means for shifting said fulcrum relative to the lever to vary the ratio of the arms thereof, a discharge plunger mounted in the discharge chamber, and means for driving said plungers.

4. In a pump comprising a measuring chamber, a discharge chamber, and an intermediate connection between said chambers, a valve arranged in said passage, means for holding said valve closed during discharge from the discharge chamber, a plunger projectable into the measuring chamber, a compensating plunger also projectable into the measuring chamber, a lever connecting said two plungers for opposite movement relative to the measuring chamber, a fulcrum for said lever, means for shifting said fulcrum relative to the lever to vary the ratio of the arms thereof, a discharge plunger mounted in the discharge chamber, and means for driving said plunger.

In witness whereof, I have hereunto set my hand and seal at Indianapolis, Indiana, this fourth day of June, A. D. one thousand nine hundred and nine.

NORMAN McCARTY. [L.S.]

Witnesses:
ARTHUR M. HOOD,
THOMAS W. McMEANS.